(12) United States Patent
Goel et al.

(10) Patent No.: US 10,331,722 B1
(45) Date of Patent: Jun. 25, 2019

(54) DYNAMIC CLUSTERING FOR UNSTRUCTURED DATA

(71) Applicant: Amazon Technologies, Inc., Seattle, WA (US)

(72) Inventors: Bhawana Goel, Issaquah, WA (US); Wei Huang, Shoreline, WA (US); Robert Mark Waugh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 15/607,162

(22) Filed: May 26, 2017

(51) Int. Cl.
*G06F 17/00* (2019.01)
*G06F 16/35* (2019.01)
*G06F 17/27* (2006.01)
*G06F 16/31* (2019.01)
*G06F 16/33* (2019.01)

(52) U.S. Cl.
CPC ............ *G06F 16/35* (2019.01); *G06F 16/313* (2019.01); *G06F 17/27* (2013.01); *G06F 16/31* (2019.01); *G06F 16/3344* (2019.01)

(58) Field of Classification Search
CPC .... G06F 16/35; G06F 16/1774; G06F 16/353; G06F 16/355; G06F 19/18; G06F 19/22
See application file for complete search history.

(56) References Cited

PUBLICATIONS

Bellman, R., "A Markovian Decision Process," Journal of Mathematics and Mechanics 6(5)679-684, Apr. 18, 1957.

Cormode, G., and S. Muthukrishnan, "An Improved Data Stream Summary: The Count-Min Sketch and Its Applications," Journal of Algorithms 55(1):58-75, Apr. 2005.

Cormode, G., "Count-Min Sketch," Encyclopedia of Database Systems, pp. 511-516.

Fu., Q., et al., "Execution Anomaly Detection in Distributed Systems Through Unstructured Log Analysis," Ninth IEEE International Conference on Data Mining, Dec. 6-9, 2009, Miami Beach, Florida, 10 pages.

Gantz, J. and D. Reinsel, "The Digital Universe in 2020: Big Data, Bigger Digital Shadows, and Biggest Growth in the Far East—United States," IDC Analyze the Future, Feb. 2013, 7 pages.

Glatz, E., et al., "Visualizing Big Network Traffic Data Using Frequent Pattern Mining and Hypergraphs," Computing 96(1):27-38, Jan. 2014.

Hu, H., et al., "Toward Scalable Systems for Big Data Analytics: A Technology Tutorial," IEEE Access 2:652-687, Jun. 24, 2014.

(Continued)

*Primary Examiner* — Truong V Vo
(74) *Attorney, Agent, or Firm* — Davis Wright Tremaine LLP

(57) ABSTRACT

A dynamic clustering algorithm is used to process log data to generate pattern information. A word frequency map may be generated and/or updated based at least in part on entries of the log data. The word frequency map may indicate occurrences of words in the log data. In addition a modified word frequency map may be determined based at least in part on the frequency of adjacent words as indicated in the word frequency map. Based at least in part on the modified word frequency map a line threshold is determined. The line threshold indicating a common frequency indicated in the modified word frequency map. The line threshold may then be used to generate a pattern for an entry of the log data.

20 Claims, 8 Drawing Sheets

(56) References Cited

PUBLICATIONS

Makanju, A., et al., "A Lightweight Algorithm for Message Type Extraction in System Application Logs," IEEE Transactions on Knowledge and Data Engineering 24(11):1921-1932, Nov. 2012.

Nimbalkar, P., et al., "Semantic Interpretation of Structured Log Files," IEEE 17th International Conference on Information Reuse and Integration, Jul. 28-30, 2016, Pittsburgh, Pennsylvania, 7 pages.

Oliner, A., and J. Stearley, "What Supercomputers Say: A Study of Five System Logs," 37th Annual IEEE/IFIP International Conference on Dependable Systems and Networks, Jun. 25-28, 2007, Edinburgh, United Kingdom, 10 pages.

Reidemeister, T., et al., "Identifying Symptoms of Recurrent Faults in Log Files of Distributed Information Systems," IEEE Network Operations and Management Symposium, Apr. 19-23, 2010, Osaka, Japan, pp. 187-194.

Vaarandi, R., "A Data Clustering Algorithm for Mining Patterns From Event Logs," Proceedings of the 3rd IEEE Workshop on IP Operations and Management, Oct. 3, 2003, Kansas City, Missouri, 8 pages.

Vaarandi, R., et al., "Event Log Analysis With the LogCluster Tool," IEEE Military Communications Conference, Nov. 1-3, 2016, Baltimore, Maryland, 6 pages.

Vaarandi, R., and M. Pihelgas, "Logcluster—A Data Clustering and Pattern Mining Algorithm for Event Logs," 11th International Conference on Network and Service Management, Nov. 9-13, 2015, Barcelona, Spain, 7 pages.

Vaarandi, R., "Mining Event Logs With SLCT and LogHound," IEEE Network Operations and Management Symposium, Apr. 7-11, 2008, Salvador, Bahia, Brazil, 4 pages.

DYNAMIC CLUSTERING FOR UNSTRUCTURED DATA

BACKGROUND

Organizations invest in technologies that provide customers with access to computing resources through services. Such services provide access to computing and/or storage resources (e.g., storage devices providing either a block-level device interface or a web service interface) to customers. Within multi-tier ecommerce systems, combinations of different types of resources may be allocated to customers and/or their applications, such as whole physical or virtual machines, CPUs, memory, network bandwidth, or I/O capacity. Block-level storage devices implemented by a storage service may be made accessible, for example, from one or more physical or virtual machines implemented by another service. To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

In a large distributed computing system (e.g., multiple distributed data centers) of a computing resource service provider, various customers, users, services, and resources of the computing resource service provider are frequently shared between customers. In addition, these computing resources are often leveraged in large-scale networks of computers, servers and storage drives to enable clients, including content providers, online retailers, customers and the like, to host and execute a variety of applications and web services. The usage of network computing allows content providers and customers, among others, to efficiently and adaptively satisfy their computing needs. However, with the growing use of virtual resources, customers are encountering situations in which the large amount of virtual computing resources makes it difficult to troubleshoot and diagnose issues. For example, a single customer's virtual computing resources may produce millions of lines of log data in a single day or even a single hour. This log data may contain useful information for troubleshooting, diagnosing, and detecting issues and anomalies within these large distributed computing systems. However, it is difficult for customers and/or service providers to discover useful information given the sheer size and amount of data to process.

BRIEF DESCRIPTION OF THE DRAWINGS

Various techniques will be described with reference to the drawings, in which.

DETAILED DESCRIPTION

Figure 1:
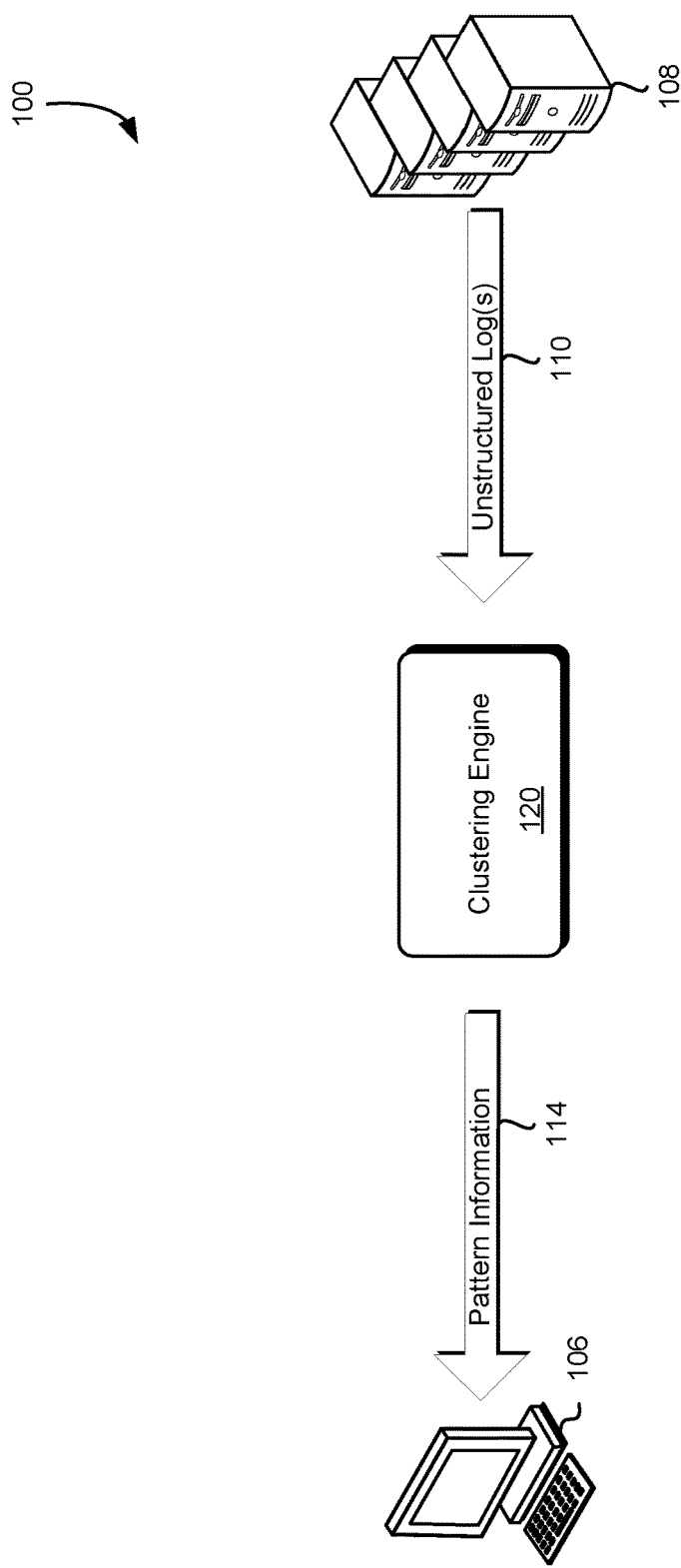
FIG. 1 illustrates an environment in which a clustering engine processes log data to generate pattern information in accordance with an embodiment.

In various examples described below, logs generated by one or more computing resources are collected, processed, and analyzed using a dynamic clustering algorithm described in greater detail below. Results of the dynamic clustering algorithm are generated and provided to various customers or other endpoint (e.g., storage location, data stream, messaging service). Furthermore, the logs may include unstructured data and/or unstructured information. For example, the information included in the logs may include textual data such as dates, numbers, and/or facts that are not defined and/or organized according to a data model or other mechanism for pre-defining the log's structure. Traditionally, irregularities, ambiguities, and complexities of information contained in unstructured logs have made it difficult to obtain useful information from such unstructured logs. Additionally, with the increased use of large distributed computer systems and virtualization, the size and number of logs is increasing with the proliferation of services provided by computing resources service providers. These logs may record events occurring during the execution of large distributed computer systems to provide an audit trail or similar information that can be used to understand the activities of these large distributed computer systems as well as detect and diagnose problems and other anomalies. The dynamic clustering algorithm described in the present disclosure provides pattern mining in these unstructured logs to enable useful information to be extracted from unstructured log data.

The dynamic clustering algorithm processes unstructured logs to construct patterns, such as line patterns, which provide information indicating the structure and frequency of information included in the unstructured logs. For example, a particular line pattern includes a pair of words above a frequency threshold. The dynamic clustering algorithm includes a data preprocessing phase, a training phase, and an analyzing phase. The data preprocessing phase, as described in greater detail below, may consist of various operations to parse, modify, and/or delete portions of unstructured log data. The training phase may be used to build an initial dataset based at least in part on the preprocessed log data. For example, as part of the training phase a word pair count is determined using a count-min sketch (CM sketch) probabilistic data structure to obtain the word pair frequency information for at least a partition of the preprocessed log data (e.g., a training set comprising the first 25 percent of the unstructured log). Additionally, the training phase, in some embodiments, includes a second scan of the preprocessed log data during which line patterns are generated for each line of the preprocessed log data based at least in part on a frequency threshold. Similarly, in the analyzing phase a scan of the preprocessed log data performed during which line patterns are generated for each line of the preprocessed log data based at least in part on the frequency threshold.

In various embodiment, an outcome of the dynamic clustering algorithm is used to generate a summarized view (e.g., content rendered in a webpage, smartphone, or tablet application, or similar user interface) of the unstructured log data including patterns (e.g., line patterns) along with frequency information. The outcome of the dynamic clustering algorithm may be used to render a large amount of unstructured log data to enable faster analysis of the information contained in the unstructured logs. Furthermore, the outcome of the dynamic clustering algorithm, in some implementations, reduces the amount of storage space required to maintain the information contained in the unstructured logs. The dynamic clustering algorithm, in various embodiments, provides the ability to monitor and analyze unstructured log information generated by application contemporaneously or near contemporaneously. In this manner, the dynamic clustering algorithm can provide real-time anomaly detection, error detection, and/or remote program execution monitoring.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a customer 106 may receive pattern information 114 from a clustering engine 120 generated based at least in part on an application of a dynamic clustering algorithm on unstructured logs 110 in accordance with an embodiment. The clustering engine 120, described in greater detail below, may be provided to the customer 106 by a computing resource service provider and may be a component of another service such as a monitoring service or a distinct service offered by the computing resource service provider. In addition, the clustering engine 120, in an embodiment, allows the customer 106 to obtain information from unstructured logs 110 generated by computing resources 108 operated by the customer 106 and provided by the computing resource service provider. The computing resource service provider may provide a variety of services to the customer 106, and the customer 106 may communicate with the computing resource service provider through service calls transmitted over a network to an interface (not shown in FIG. 1), which may be a web service interface or any other type of customer interface. Although only the clustering engine 120 is shown in FIG. 1, the computing resource service provider may provide a variety of services to the customer 106. Furthermore, each service may have its own interface and, generally, subsets of the services may have corresponding interfaces in addition to or as an alternative to a single interface for the computing resource service provider.

In an embodiment, the customer 106 is an organization that may utilize one or more of the services provided by the computing resource service provider to maintain and deliver information to various entities which may be located in various geographical locations. In yet other embodiments, the customer 106 includes individuals who utilize the services of the computing resource service provider for remote application execution. The customer 106 may communicate with the computing resource service provider through a network such as the Internet, an intranet or an Internet service provider (ISP) network. Some communications from the customer 106 to the computing resource service provider may cause the computing resource service provider to operate in accordance with one or more embodiments described in the present disclosure. For example, the customer 106 can transmit a request to the computing resource service provider which, when processed by one or more services of the computing resource service provider, causes the clustering engine 120 to process the unstructured logs 110 obtained from computing resources 108.

In various embodiments, the computing resources 108 include a variety of virtual computer systems and physical computer systems operated by the customer 106. The computing resources 108 may include virtual machine instances, dedicated physical hardware, container instances, storage devices, network appliances, load balancers, processors, memory, or any other physical or virtual computing resource. In addition, the computing resources 108 may be operated by the customer 106 but may be provided by one or more other entities. For example, a portion of the computing resources 108 is provided by the customer in an on-premises data center (e.g., a data center operated by the customer) and another portion of the computing resources 108 is provided by the computing resource service provider as described above.

During operation of computing resources 108 (e.g., remote application execution on behalf of the customer 106), the computing resources 108 may generate unstructured logs 110. As described above, the unstructured logs 110 may include information indicating the operations and events of the computing resources 108. For example, an entry in an unstructured log may contain the following information "Fri Feb 17 07:54:56.909 [INFO] wl0: MDNS: IPV4 Addr: 10.237.91.65," indicating an event and information associated with the event. Specifically in this example, the event is a multicast Domain Name System (mDNS) query from a particular internet protocol (IP) address. The unstructured logs 110, in various embodiments, are considered unstructured because the information included in the unstructured logs 110 does not have a defined data model or is not required to comply with a specific set of defined data models.

The unstructured logs 110 may be semi-structured or may even have a formally defined structured but may still be considered unstructured because the customer 106 or other entity determines that the structure is not helpful for processing the unstructured logs to perform at least one task. Returning to the example above, the log entry may be considered to have some structure because the log entry includes a time stamp "Fri Feb 17 07:54:56.909" and a tag "[INFO];" however, for the purposes of the present disclosure the log entry may still be considered unstructured because the structure (e.g., time stamp and tag) is not, without transformation, in a format suitable for performing at least one task (e.g., determining that an mDNS query was received).

Returning to FIG. 1, the unstructured logs 110 may be obtained directly from the computing resources 108 or, as described in greater detail below, may be obtained from one or more intermediaries, such as a log service and/or a streaming service. In an embodiment, the unstructured logs 110 are maintained in persistent storage and retrieved by the clustering engine 120 to be processed and used to generate pattern information 114 in response to a request from the customer 106. In yet other embodiments, the unstructured logs 110 are streamed to the clustering engine 120 and processed to generate pattern information 114 as the unstructured logs 110 are received. In general, any mechanism for distributing information to the clustering engine 120 to be processed using the dynamic clustering algorithm is considered within the scope of the present disclosure.

Once the unstructured logs 110 are obtained by the clustering engine 120, the clustering engine 120, in various embodiments, performs various preprocessing operations on the unstructured logs 110 to generate preprocessed logs. For example, common prefixes are removed, time stamp and/or other date and time information is removed, and a common delimiter is set. Other preprocessing operations may also be performed such as combining or splitting unstructured logs 110 and/or entries within the unstructured logs 110. In general any operation or mechanism to process the unstructured logs 110 to improve the operation and/or functionality of the dynamic clustering algorithm is considered within the scope of the present disclosure. For example, the unstructured logs 110 are parsed and certain characters are replaced with a common delimiter such as a space. As described in the present disclosure a word may include any set of characters separated by at least one delimiter. In an embodiment, a word may include a set of letters, numbers, and symbols between two delimiters. Returning to the example above, if the common delimiter is a space, a word can include any set of characters between two spaces such as "error$42$."

As described in greater detail below, the clustering engine 120 may execute a training phase as part of the dynamic clustering algorithm. The training phase, in various embodiments, generates initial information and/or dataset such as a word pair frequency map, which is used during the analyzing phase of the dynamic clustering algorithm. In addition, the training phase may be executed using a portion of the unstructured logs 110. For example, the training dataset includes the first 500 entries of the unstructured logs 110. As another example, the training dataset includes 5% of the available unstructured logs 110. As yet another example, the training datasets include a portion of the unstructured logs 110 that overlaps with a portion of the unstructured logs 110 used during the analyzing phase. Furthermore, the training phase may include two scans and/or two sets of operations on the training dataset. In an embodiment, during the initial scan, the clustering engine 120 generates a word pair frequency map containing frequency information for the sets of word pairs contained in the training data set. The word pair frequency map may be generated using a count-min sketch data structure as defined in "An improved data stream summary: the count-min sketch and its applications" by G. Cormode and S. Muthukrishnan published in the Journal of Algorithms volume 55(1) pages 58-75 published in 2005 and hereby incorporated by reference to the same extent as if each reference were individually and specifically indicated to be incorporated by reference and were set forth in its entirety.

The clustering engine 120 may map or otherwise track the frequency of word pairs defined as $f(w_{i,j-1}, w_{i,j})$ where $w_{i,j}$ defines the current word in the line, $w_{i,j-1}$ defines the word appearing directly before $w_{i,j}$, and $f(w_{i,j-1}, w_{i,j})$ defines the number of instances of the word pair. For example, for every instance of the word pair $w_{i,j-1}$, $w_{i,j}$ the frequency of the word pair $f(w_{i,j-1}, w_{i,j})$ is incremented. In various embodiments, $w_{i,1}$ is used to track the first word in the line and $w_{i,x}$ is used to track the last word in the line. In these embodiments, the frequency information for the single word $w_{i,1}$ or $w_{i,x}$ is tracked as an edge case. In various embodiments, the clustering engine 120 may track any plurality of words included in the unstructured logs 110 and/or preprocessed logs. For example, the clustering engine 120 tracks $f(w_{i,j-1}, w_{i,j}, w_{i,j+1})$ where $w_{i,j}$ defines the current word in the line, $w_{i,j-1}$ defines the word appearing directly before $w_{i,j}$, and $w_{i,j+1}$ defines the word appearing directly after $w_{i,j}$. In this manner the clustering engine 120 may track any number of set of words. For example, depending on the information included in the unstructured logs 110, it may provide the customer 106 with more useful information to generate pattern information based on a set of four adjacent words included in the unstructured logs 110 and/or preprocessed logs.

In an embodiment, the clustering engine 120 then performs a second scan of the training dataset to determine modified word pair frequency information, a line threshold, and a set of line patterns which may be used to generate the pattern information 114. In this embodiment, the clustering engine 120 for each line $l_i$, $(1 \leq i \leq N)$, where N is the total number of lines in the training dataset, determines the modified word pair frequency information as defined by:

$$f'(w_{i,j-1}, w_{i,j}) = \max(f(w_{i,j-1}, w_{i,j}), f(w_{i,j}, w_{i,+1j}))$$

Therefore, the modified word pair frequency is defined as the highest frequency between the current word pair and the next word pair in the line $l_i$. For example, given the unstructured log 110 and/or preprocessed log line as "AirPort:Link Down on the awdl0" and the word pair frequencies, determined based at least in part on a word pair frequency map of the training data set as described above, as f(Airport: Link)=4, f(Airport: Link, Down)=2, f(Down on)=2, f(on the)=4, f(the: awdl0)=1, the clustering engine 120 determines the modified word pair frequency map as f'(4, 2, 4, 4, 1) where each element is the max of the word pair and the next word pair in the word pair frequency map.

In various embodiments, the clustering engine 120 then determines the line threshold $t_i$ for the line $l_i$ based at least in part on the most common frequency in the modified word pair frequency map. Returning to the example above, the line threshold $t_i=4$ since there are 3 instances of the frequency 4 in the modified word pair frequency map. In embodiments, where there are two or more frequencies that are the most common, the mean of the frequencies rounded up is used. Other mechanisms for determining the line threshold in the case of a tie may be used in connection with the present disclosure, for example, selecting a member of the set of tied frequencies at random, selecting the highest number, selecting the lowest number, or any other mechanism for determining the line threshold when two or more values satisfy the conditions.

Then, based at least in part on the line threshold $t_i$, the clustering engine may determine a line pattern $p_i$ for the line $l_i$. In various embodiments, the line pattern $p_i$ is constructed from the word pairs having a frequency at or above the line threshold $t_i$. Returning to the example above, the line threshold $t_i=4$ therefore the line pattern $p_i$ is constructed from the word pairs having a frequency at or above 4 or $p_i$=(Airport: Link * on the *) where the remainder of the words in the line $l_i$ are replaced with the character "*." In addition, a line pattern frequency may be used to track the number of times where the line pattern $p_i$ has been observed.

In various embodiments, the analyzing phase of the dynamic clustering algorithm performed by the clustering engine 120 is identical to the second scan performed during the training phase. The analyzing phase may be used by the clustering engine 120 to determine pattern information 114 such as line patterns, determined based at least in part on the unstructured logs 110. For example, once the clustering engine 120 has executed the training phase on a training dataset, the clustering engine 120 is then used to analyze a stream of unstructured log data 110 to provide the customer 106 with contemporaneous or near contemporaneous monitoring of the computing resources 108. As described in greater detail below, during the analyzing phase the clustering engine 120 may for each line $l_i$ update the word pair frequency map based at least in part on the word pairs included in the line $l_i$, generate a modified word pair frequency, determine the line threshold $t_i$, and generate the line pattern $p_i$ for the line $l_i$.

Figure 2:
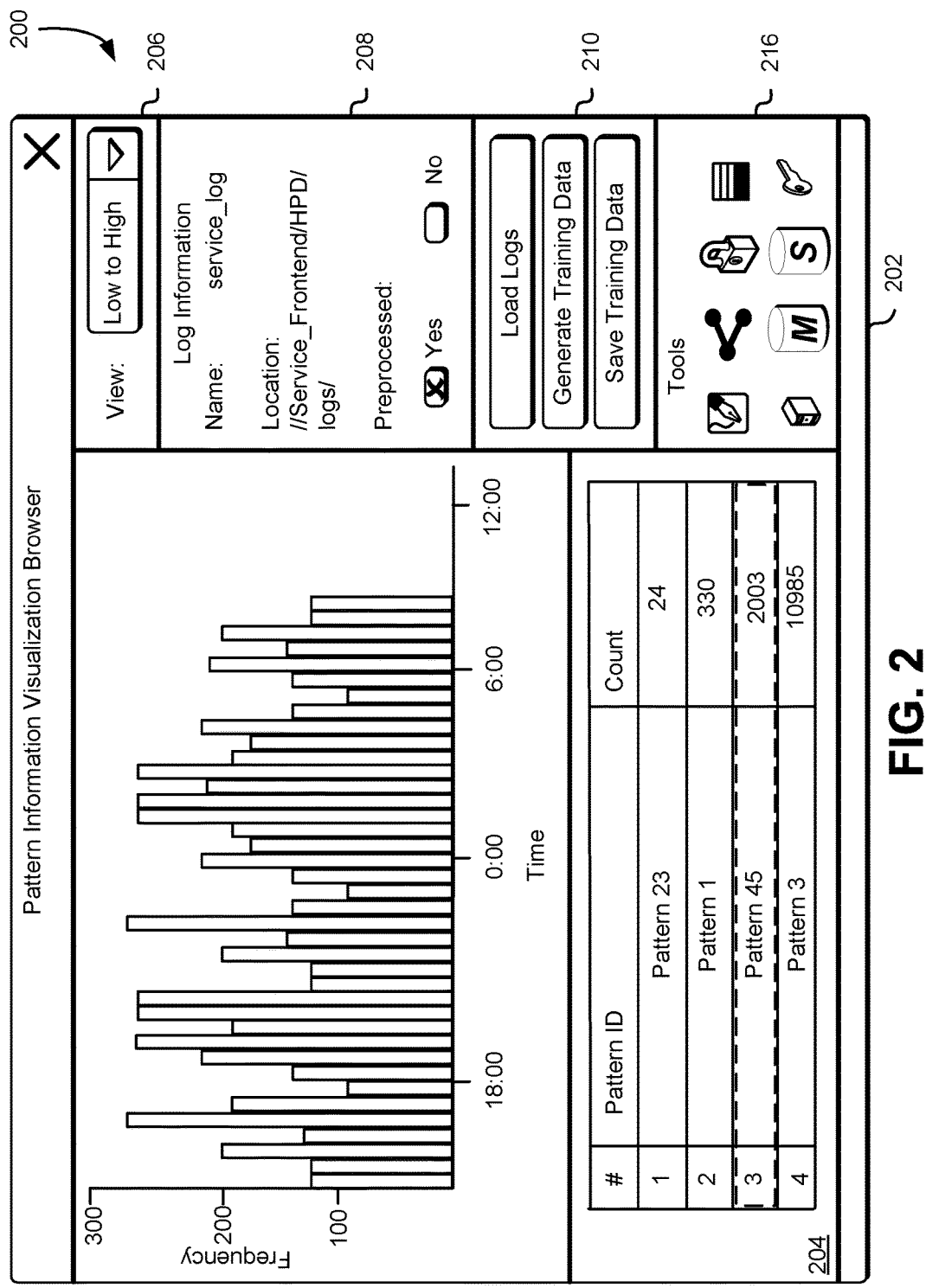
FIG. 2 is a diagram illustrating a management console exposed as a webpage enabling customers to view and interact with pattern information generated by a clustering engine in accordance with at least one embodiment.

FIG. 2 illustrates an example environment 200 where a pattern information visualization browser 202 may be used to monitor unstructured logs generated by computing resources as described in the present disclosure at least as described above in connection with FIG. 1 and in accordance with at least one embodiment. The pattern information visualization browser 202 enables a customer to analyze unstructured logs, view pattern information generated as a result of analyzing the unstructured logs, monitor remote applications executed, troubleshoot issues associated with computing resources, view log information, generate training data, save pattern data, view frequency information, and generally diagnose, view, and troubleshoot useful information contained in unstructured logs. In various embodiments, the pattern information visualization browser 202 is a computer system service such as a web service and provided as a clustering engine or other service of the computing resource service provider as described in the present disclosure.

As illustrated in FIG. 2, the pattern information visualization browser 202 is provided as a user interface executed by an application such as a web browser executing on a computer system operated by the customer, as well as other user interfaces that may be used to present unstructured log information to the customer and may, in some embodiments, be generated by the computing resource service provider and sent to the customer's display for rendering. In other embodiments, the customer's computing device may include functionality to generate some or all portions of the user interface. For example, the customer's web browser may include code for generating some of the graphics for rendering data received from the computing resource service provider, such as the frequency information displayed in display pane 204. The computing resource service provider may receive information from the customer's computing device and provide the information to other computing resources such as the clustering engine. For example, the customer's selection of a particular pattern displayed in the display pane 204 causes the computing resource executing the pattern information visualization browser 202 to transmit a request to the clustering engine to return additional pattern information associated with the particular pattern selected by the customer. The user interface may be generated or caused to be generated by the orchestration service as described in the present disclosure.

The pattern information visualization browser 202 may include tools 216 that aid the customer in diagnosing and/or troubleshooting anomalies based at least in part on the pattern information and/or visualization of pattern information in the pattern information visualization browser 202. For example, the tools 216 may include a graphical user interface element such as the buttons illustrated in FIG. 2, where selection of the graphical user interface element may cause the clustering engine to display information to the customer to aid the customer in diagnosing an error event recorded in an unstructured log of a customer operated computing resource.

In various embodiments, the pattern information visualization browser 202 produces the graphical representation of line pattern frequencies generated as a result of executing a dynamic clustering algorithm as described above. For example, the pattern information visualization browser 202, in response to a request from a customer, transmits an API call or other command to the clustering engine to obtain pattern information generated based at least in part on the clustering engine analyzing an unstructured log indicated in the log information 208. As illustrated in FIG. 2, this pattern information and frequency information can be displayed in various formats in the display pane 204, including a bar graph illustrating frequency (e.g., a number of occurrences) over an interval of time (e.g., a time stamp included in the unstructured log). In addition, the display pane 204, as illustrated in FIG. 2, includes a table listing patterns in ascending order from the lowest frequency to the highest frequency based at least in part on a view 206 selected by the customer. In various embodiments, the display pane 204 only displays a portion of the patterns generated by the clustering engine.

In the embodiment illustrated in FIG. 2, the customer may select a particular pattern (shown in FIG. 2, with dashed lines) to obtain additional information associated with the pattern. For example, selection of the pattern may cause the bar graph to be displayed. In yet another example, selection of the pattern causes the line pattern or other pattern to be displayed, illustrating information contained in the unstructured logs. Using the example above as described in connection to FIG. 1, selection of the pattern causes the line pattern $p_i$=(Airport: Link * on the *) to be displayed.

As illustrated in FIG. 2, the pattern information visualization browser 202 further includes a set of options 210 used to perform various functions in connection with the pattern information visualization browser 202. The set of options 210 may be a set of functions included in the pattern information visualization browser 202 that enables a customer to perform a variety of operations such as loading logs into the clustering engine, generating training data, and/or saving training data. The options 210 may be configured as graphical user interface elements of the pattern information visualization browser 202.

The load logs button may enable the customer to select particular unstructured logs or computing resources that generate unstructured logs to be provided to the clustering engine. The generate training data button may enable the customer to select a portion of an unstructured log or a set of unstructured logs to be used during a training phase of a dynamic clustering algorithm executed by the clustering engine. The save training data button may enable the customer to save a particular training dataset for use during a training phase implemented by the clustering engine.

Figure 3:
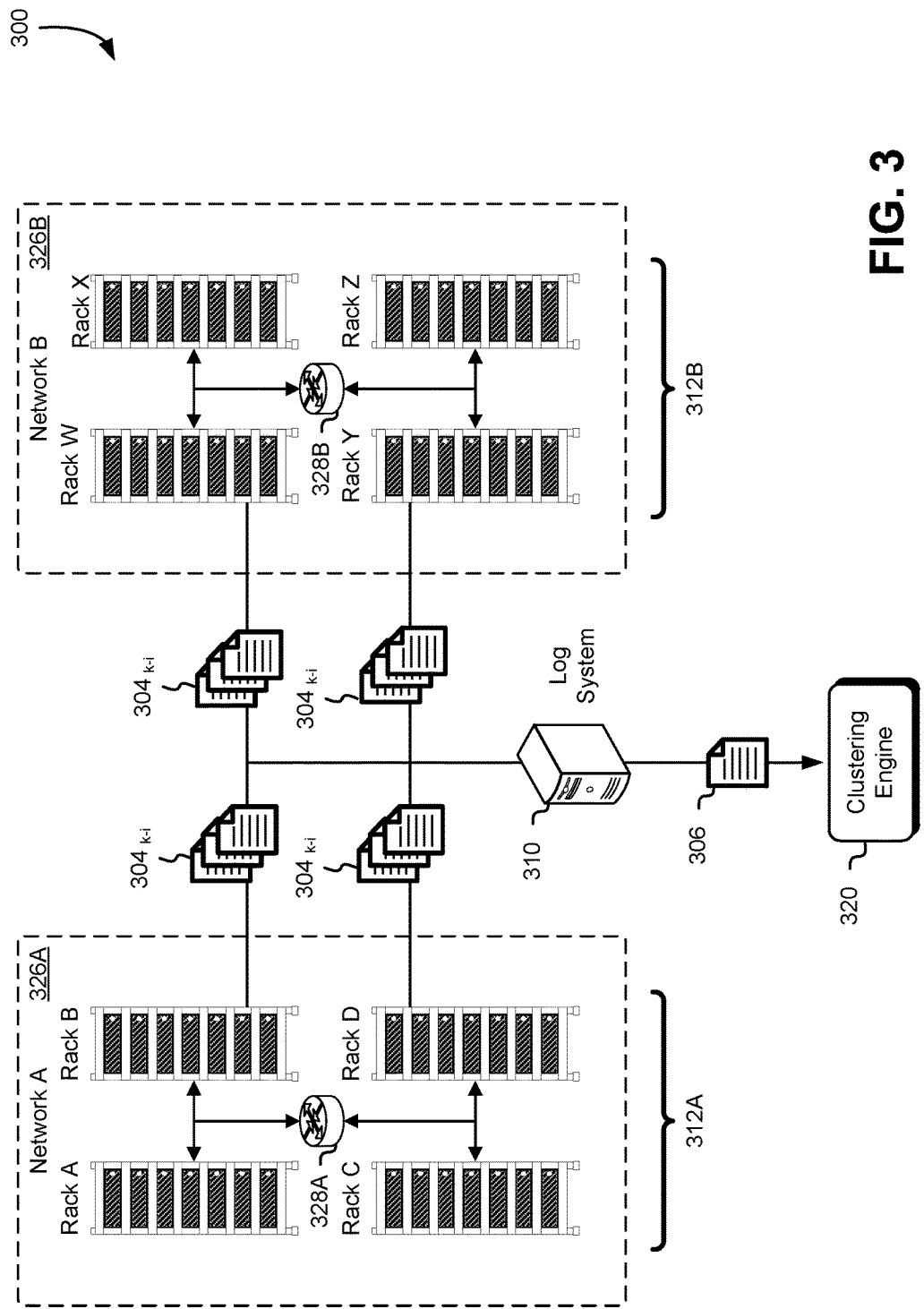
FIG. 3 illustrates an environment in which a clustering engine processes log data obtained from a log system to generate pattern information in accordance with an embodiment.

FIG. 3 illustrates an aspect of an environment 300 in which an embodiment may be practiced. Specifically, FIG. 3 depicts the collection, processing, and analysis of logs $304_{k-i}$, such as unstructured logs, as described above, generated by computing resources. As described above, a clustering engine 320 may use a dynamic clustering algorithm to perform analysis, error detection, anomaly detection, and/or monitoring of the computing resources based at least in part on the log $304_{k-i}$. The environment 300 may include a log system 310 that receives one or more logs $304_{k-i}$ from computing resources executed by servers in the sets of racks 312A-312B. The data collected by the log system 310 may include various logs $304_{k-i}$ obtained from different computing resources executed by the servers in the sets of racks 312A-312B. The log system 310 may be a computing system of one or more computing systems operated by a computing resource service provider that obtains logs $304_{k-i}$ generated by computing resources as described above in connection with FIG. 1. In various embodiments, the log system 310 processes the logs $304_{k-i}$ and generates preprocessed logs 306 which may be consumed by the clustering engine 320, for example, as a stream of data or as a log file in a particular format to enable the clustering engine 320 to execute the dynamic clustering algorithm.

The sets of racks 312A-312B may be physical hardware configured to host one or more servers or, in some embodiments, may simply be logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The servers in a rack may be members of a particular network. In some implementations, multiple racks of servers may be members of the same network. For example, as illustrated in FIG. 3, the servers of the set of racks 312A share the network 326A. Likewise, the servers of the set of racks 312B share the network 326B.

The networks 326A-326B may be data communication pathways between one or more electronic devices. The networks 326A-326B may be wired or wireless networks and may use any of a variety of communications protocols for organizing their network traffic. The networks 326A-326B may allow the sharing of files, data, and other types of information between the one or more electronic devices accessible through the data communication pathways. Each of the networks 326A-326B may be associated with a router, such as an aggregation router that aggregates the servers of the respective set of racks into the common network, separate from the router associated with the other network. Each of the networks 326A-326B may be on a different subnet than the other network. For example, as illustrated in FIG. 3, the servers of the set of racks 312A may be commonly connected to a router 328A. Similarly, the servers of the set of racks 312B may be commonly connected to a router 328B. The routers 328A-328B may be networking devices that forward packets between computer networks, such as between the networks 326A-326B.

The log system 310 may also include a data warehouse or data storage system that stores the preprocessed logs 306 and/or the logs $304_{k-i}$ such that the logs may be queried or otherwise obtained by the clustering engine 320. In this manner, the clustering engine 320 may be able to query the log system 310 to obtain particular preprocessed logs 306 and/or the logs $304_{k-i}$ as well as being provided the preprocessed logs 306 and/or the logs $304_{k-i}$ through a data stream or other mechanism for providing the data to the clustering engine 320. In various embodiments, the data stream includes the preprocessed logs 306 and/or the logs $304_{k-i}$. The clustering engine 320 may be a computer system that enables a customer and/or technician, for example, to debug computing resources implementation of the customer's application.

Additionally, clustering engine 320 may be another service or computer system of the computing resource service provider. For example, computing resources executed by the servers on racks 312A and 312B may store data on behalf of the customer, and the clustering engine 320 may be a service of the computing resource service provider configured to detect errors in the computing resources and alert the customer or computing resource service provided to the errors so that they may be mitigated. In order to determine errors in the operation of the computing resources, the clustering engine 320 may provide the customer with useful information obtained from the preprocessed logs 306 and/or the logs $304_{k-i}$ generated based at least in part on an execution of the dynamic clustering algorithm. The clustering engine 320 may include software or other executable code that when executed by one or more processors causes the clustering engine to implement the dynamic clustering algorithm as described above. In addition, the clustering engine 320 may be executed by the servers in the racks 312A and 312B.

Figure 4:
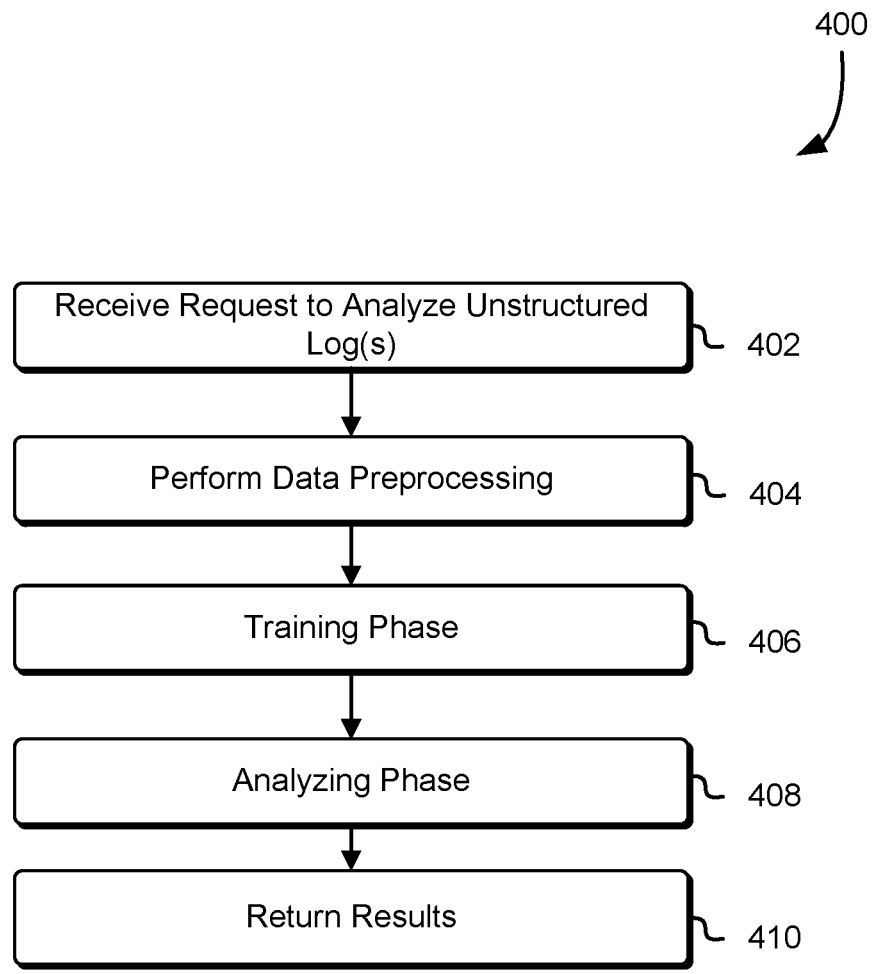
FIG. 4 is a block diagram illustrating a process for analyzing unstructured log data using a dynamic clustering algorithm in accordance with an embodiment.

FIG. 4 is a block diagram illustrating an example of a process 400 for obtaining useful information from unstructured logs using a dynamic clustering algorithm to be provided to a customer in accordance with at least one embodiment. Some or all of the process 400 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 400 may be performed by any suitable system, such as a server in a data center, by various components of the environment 300 described in conjunction with FIG. 3, such as the clustering engine 320, by multiple computing devices in a distributed system of a computing resource service provider, or by a service provided by a computing resource service provider. The process 400 includes a series of operations where the clustering engine, in response to a request from a customer, obtains unstructured logs and processes the unstructured logs in accordance with the dynamic clustering algorithm as described above. For example, the process 400 includes receiving a request to analyze unstructured logs 402. As described above, the customer may, through interactions with a management console exposed as a webpage, cause API calls to be generated and transmitted to the clustering engine. In addition, the customer may specify particular unstructured log files to have analyzed or may specify particular computing resources generating unstructured log files to have analyzed. As described above, the unstructured logs may be obtained from a storage device, one or more intermediaries computer systems (a streaming service or log service), and/or directly from the computing resources responsible for generating the unstructured logs. Furthermore, the unstructured logs may be obtained all at once and analyzed or may be obtained in segments less than the entirety of the unstructured logs to be analyzed. In one example, the unstructured logs are streamed and analyzed as the stream of unstructured log data is received. In another example, the unstructured logs for a single day are stored in a storage device and obtained and analyzed by the clustering engine.

Once the unstructured logs are obtained, the clustering engine may then perform data preprocessing on the unstructured log data 404. As described above, preprocessing of the unstructured logs may include a variety of operations to facilitate execution of the dynamic clustering algorithm. For example, a common delimiter is selected, multiple line and/or entries in the unstructured logs are expanded or combined, date and time information is modified or removed, or any operation performed on the unstructured log data 404 to improve the functionality of the dynamic clustering algorithm. Once the unstructured logs have been processed to generate preprocessed log data, the clustering engine may execute a training phase of the dynamic clustering algorithm 406. As described above, the training phase may include two scans or operations on the preprocessed log data. In an embodiment, during the first scan of the preprocessed log data the clustering engine generates a word pair frequency map using a count-min sketch data structure. In yet other embodiments, the frequency map is generated for sets of words of various lengths. For example, the dynamic clustering algorithm can be executed using sets of words of length four. In addition, other mechanisms for generating, storing, and maintaining a count and/or frequency information for words and/or sets of words in the preprocessed log data are considered within the scope of the present disclosure.

During the second scan of the preprocessed log data, the clustering engine may generate pattern information for lines and/or entries in the preprocessed log data as described above. For example, the clustering engine generates modified word pair frequencies by taking the maximum frequency of adjacent word pairs (or sets of words if the dynamic clustering algorithm is operating on sets of words greater than two). The clustering engine, in this example, then selects the line threshold based at least in part on the most commonly occurring frequency. As described above, various mechanisms may be used if there is more than one most commonly occurring frequency, such as taking the mean of the most commonly occurring frequencies. Returning to the example above, once the line threshold is determined; pattern information is generated by selecting the word pairs with frequencies at or above the line threshold based at least in part on information included in the word pair frequency map.

Once the clustering engine has completed the training phase, the clustering engine may then execute the analyzing phase 408. As described above, the analyzing phase, in an embodiment, is the same as the second pass of the training phase. For example, the clustering engine may generate a modified word pair frequency map for a line and/or entry in the preprocessed log data. Then the clustering engine, in this example, will determine the line threshold based at least in part on the maximum frequency between a word pair in a line of the preprocessed log data and the adjacent word part. Finally, the clustering engine will construct a line pattern based at least in part on the word pair frequency map and the line threshold. The clustering engine, as illustrated in FIG. 4, then returns the results of the dynamic clustering algorithm 410. In various embodiments, the results include useful information from the unstructured logs such as pattern information, pattern frequency information, pattern distribution over an interval of time, rate of change of pattern information, or any other information that may aid in the detection, diagnosis, and correction of errors, and/or anomalies.

Note that one or more of the operations performed in 402-410 may be performed in various orders and combinations including in parallel. For example, the system executing the process 400 may transmit results of the analyzing phase as pattern information is being generated by the clustering engine. In numerous variations to the process 400, one or more of the operations 402-410 may be omitted or performed by other systems of services. For example, preprocessing of the unstructured log data may be omitted or performed by another service such as a streaming service or log system as described above.

Figure 5:
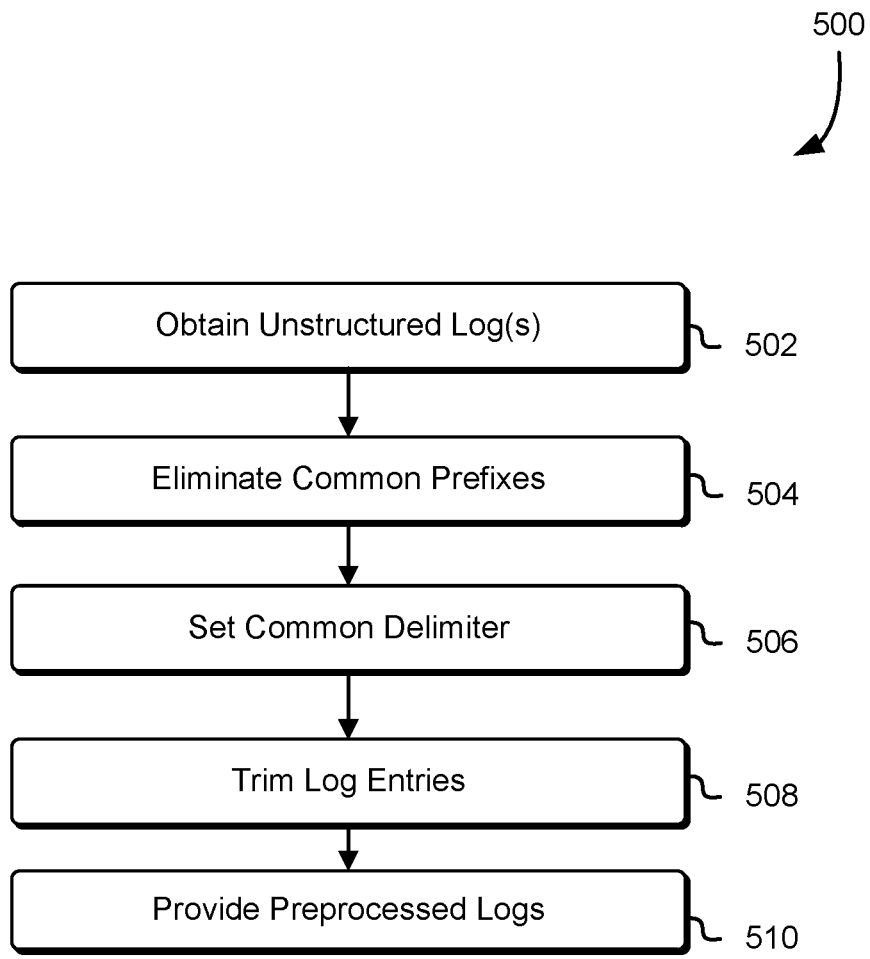
FIG. 5 is a block diagram illustrating a process for preprocessing unstructured log data for use with a dynamic clustering algorithm in accordance with an embodiment.

FIG. 5 is a block diagram illustrating an example of a process 500 for processing unstructured logs to generate preprocessed log data to be used in a dynamic clustering algorithm in accordance with at least one embodiment. Some or all of the process 500 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 500 may be performed by any suitable system, such as a server in a data center, by various components of the environment 300 described in conjunction with FIG. 3, such as the clustering engine, by multiple computing devices in a distributed system of a computing resource service provider, or by a service provided by a computing resource service provider. The process 500 includes a series of operations where the clustering engine performs various preprocessing operations on unstructured logs to improve the operation and functionality of the dynamic clustering algorithm. For example, the process 500 includes obtaining unstructured logs 502. As described above, the unstructured logs may be obtained from a storage device, one or more intermediary computer systems (a streaming service or log service), and/or directly from the computing resources responsible for generating the unstructured logs. Furthermore, the unstructured logs may be obtained all at once and preprocessed or may be obtained in segments less than the entirety of the unstructured logs to be preprocessed. In one example, the unstructured logs are streamed and preprocessed contemporaneously or near contemporaneously as the stream of unstructured log data is received. In another example, the unstructured logs for a single day are stored in a storage device and preprocessed only prior to being analyzed by the clustering engine.

The system performing the process 500 may then eliminate common prefixes from the unstructured logs 504. For example, a particular log may contain prefixes such as "event," "in bound," "out bound," "error," or any number of other prefixes common to the unstructured logs that are removed to increase the effectiveness of the dynamic clustering algorithm by at least providing customers with more accurate result and/or result with more pertinent information. The system performing the process 500 may then set a common delimiter 506. The common delimiter may be determined based at least in part on the character included in the unstructured logs or may be determined by another entity and added to the unstructured logs. In one example, a blank character or "space" is selected as the common delimiter delineating distinct words because the unstructured log contains a space between words. In another example, a colon is added to the unstructured logs between words and set as the common delimiter.

The system performing the process 500 may then trim log entries 508. Trimming log entries may include a variety of operations such as removing time stamps or other date information, removing common suffixes, deleting multiplicative log entries, combining multiple log entries into a single line, or any other operation to trim unstructured logs for the dynamic clustering algorithm. The system performing the process 500 may then provide the preprocessed log data 510. In various embodiments, the clustering engine simply provides the preprocessed logs to the component of the clustering engine executing the training phase and/or analyzing phase of the dynamic clustering algorithm. In yet other embodiments, the preprocessed logs are persisted in a storage device and/or streamed to a destination such as the clustering engine.

Note that one or more of the operations performed in 502-510 may be performed in various orders and combinations, including in parallel. For example, the system executing the process 500 may detect and remove common prefixes and trim the unstructured logs in parallel. In numerous variations to the process 500, one or more of the operations 502-510 may be omitted or performed by other systems or services. For example, the unstructured log entries may not be trimmed.

Figure 6:
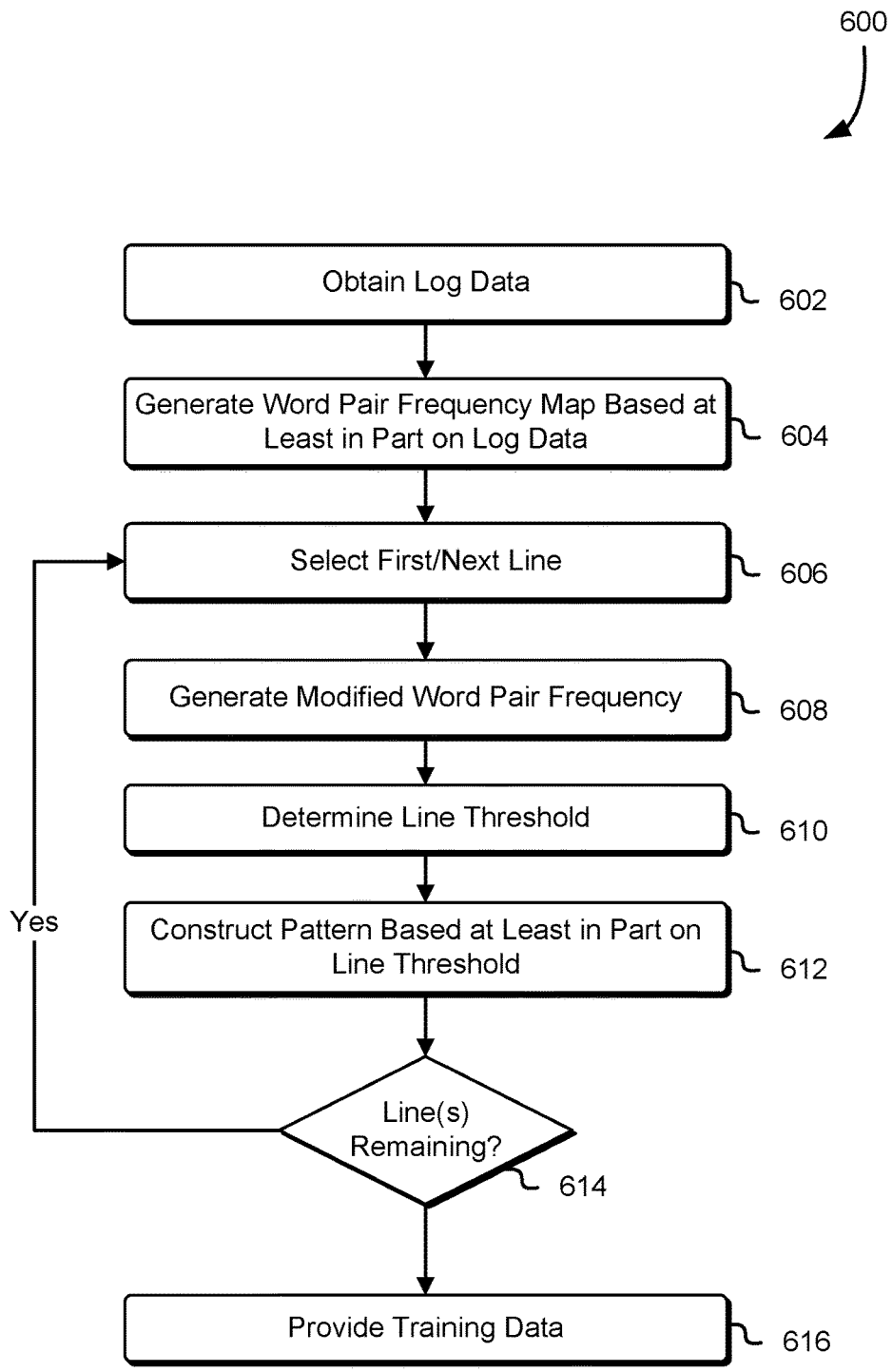
FIG. 6 is a block diagram illustrating a process for a training phase of a dynamic clustering algorithm in accordance with an embodiment.

FIG. 6 is a block diagram illustrating an example of a process 600 for executing a training phase of a dynamic clustering algorithm in accordance with at least one embodiment. Some or all of the process 600 (or any other processes described, or variations, and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 300 described in conjunction with FIG. 3, such as the clustering engine, by multiple computing devices in a distributed system of a computing resource service provider, or by a service provided by a computing resource service provider. The process 600 includes a series of operations where log data is processed to generate training data for use in an analyzing phase of the dynamic clustering algorithm. For example, the process 600 includes obtaining log data 602. As described above, the log data may be obtained from a persistent storage or may be streamed from one or more intermediaries. In addition, the log data may include unstructured logs and/or preprocessed log data as described above. Furthermore, the log data may include a training set of log data which is less than the entire set of unstructured logs to be analyzed by the clustering engine.

The clustering engine may then generate a word pair frequency map based at least in part on the log data 604. The word pair frequency map, in an embodiment, contains information indicating the number of occurrences (e.g., frequency) of a particular word pair in the log data. In various embodiments, the word pair frequency map is generated as a count-min sketch data structure as described above. The clustering engine may then select the first/next line of the log data 606. Once the word pair frequency map has been generated for the entire log data, the clustering engine may then evaluate the log data on a per-line and/or per-entry basis to generate pattern information for each line. To this end, the clustering engine may select a line from the log data and begin processing the information.

The clustering engine, as illustrated in FIG. 6, then generates modified word pair frequency information 608. The modified word pair frequency, as defined in various embodiments described in greater detail above, is the maximum of the word pair frequency and the adjacent word pair frequency. The clustering engine may then determine the line threshold based at least in part on the modified word pair frequency 610. For example, if the modified word pair frequency map for a set of 5 word pairs includes the following frequencies "4, 5, 5, 2, 3," then the line threshold for the selected line is defined by the frequency with the most occurrences in the modified word pair frequency map, "5" in this example. The clustering engine may then generate pattern information for the selected line based at least in part on the line threshold 612. In an embodiment, the pattern information includes word pairs in the selected line with frequencies greater than or equal to the line threshold based at least in part on the word pair frequency map as described above. Returning to the example above with a line threshold of 5, the pattern for the line includes the word pairs in the line with a frequency of 5 or greater in the word pair frequency map generated in step 604.

The cluster engine may then determine if there are lines remaining in the log data 614. If there are lines remaining, then the clustering engine may return to step 606 and select the next line and continue with the process 600. If there are no lines remaining in the log data, the clustering engine may provide training data 616. The training data may include any patterns generated for the lines of the log data and the word pair frequency map. The training data, in various embodiments, is provided to a component of the clustering algorithm executing the analyzing phase of the dynamic clustering algorithm. In yet other embodiments, the training data may be stored in a storage device and maintained for use later by the clustering engine.

Note that one or more of the operations performed in 602-616 may be performed in various orders and combinations including in parallel. For example, the system executing the process 600 may process multiple lines of the log data in parallel. In numerous variations to the process 600, one or more of the operations 602-616 may be omitted or performed by other systems of services. For example, the word pair frequency map for a given set of logs may be determined by one or more intermediaries such as a streaming service described above.

Figure 7:
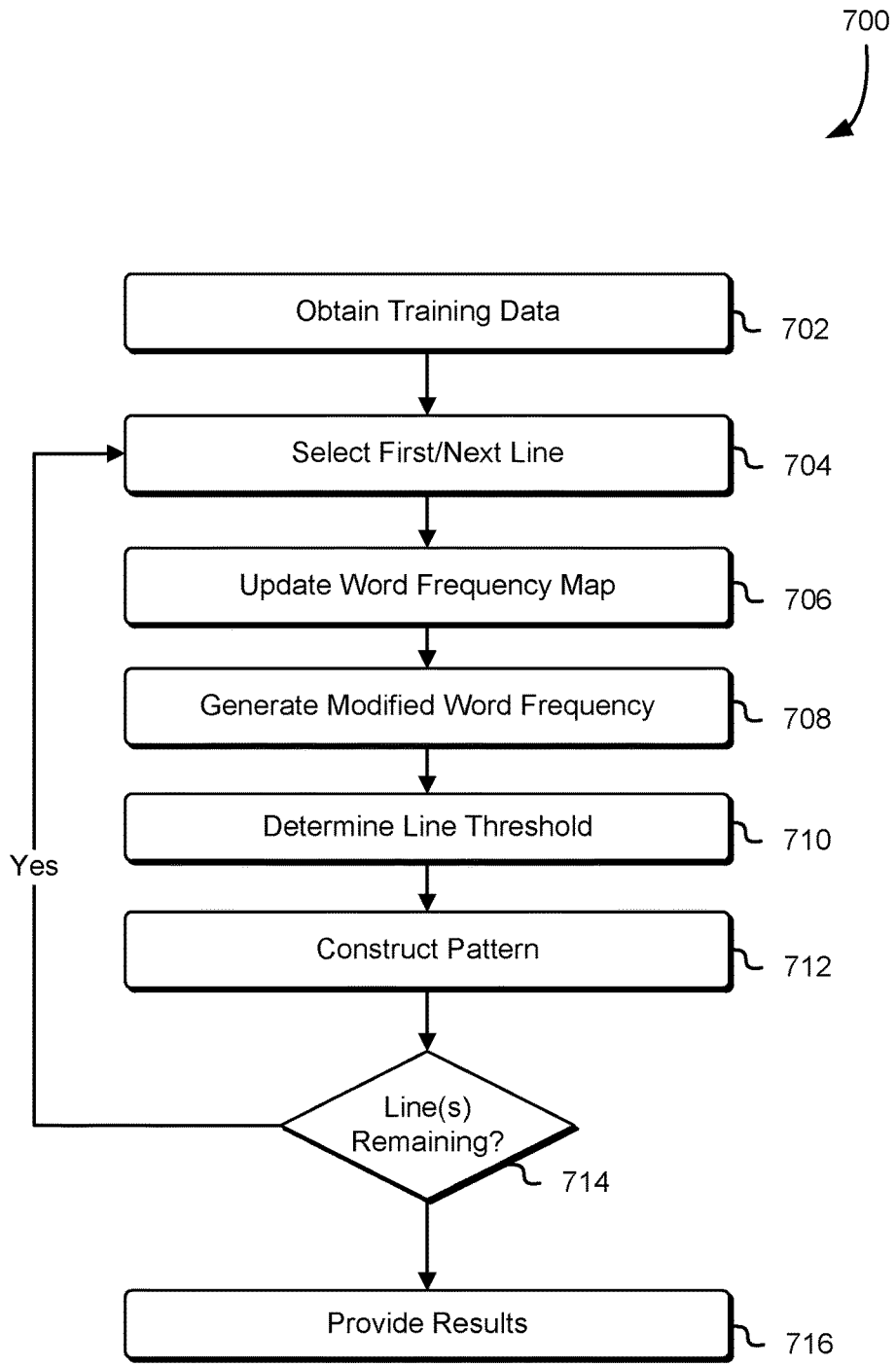
FIG. 7 is a block diagram illustrating a process for an analyzing phase of a dynamic clustering algorithm in accordance with an embodiment.

FIG. 7 is a block diagram illustrating an example of a process 700 for executing an analyzing phase of a dynamic clustering algorithm in accordance with at least one embodiment. Some or all of the process 700 (or any other processes described or variations and/or combinations of those processes) may be performed under the control of one or more computer systems including executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 300 described in conjunction with FIG. 3, such as the clustering engine, by multiple computing devices in a distributed system of a computing resource service provider, or by a service provided by a computing resource service provider. The process 700 includes a series of operations where log data in processed to generate useful information for customers. For example, the process 700 includes obtaining training data 702. As described above, the training data may be generated during a training phase of the dynamic clustering algorithm.

The clustering engine may then select the first/next line of the log data 704. Once the training data has been obtained, the clustering engine may then evaluate the log data on a per-line and/or per-entry basis to generate pattern information for each line. To this end, the clustering engine may select a line from the log data and begin processing the information. The clustering engine may then update the word pair frequency map based at least in part on the information contained in the selected line 706. The word pair frequency map, in an embodiment, contains information indicating the number of occurrences (e.g., frequency) of a particular word pair in the log data. In various embodiments, the word pair frequency map is generated as a count-min sketch data structure as described above. Updating the word pair frequency map may include incrementing a counter for each word pair detected in the selected line in the count-min sketch data structure.

The clustering engine, as illustrated in FIG. 7, then generates modified word pair frequency information 708. The modified word pair frequency, as defined in various embodiments described in greater detail above, is the maximum of the word pair frequency and the adjacent word pair frequency. The clustering engine may then determine the line threshold based at least in part on the modified word pair frequency 710. For example, if the modified word pair frequency map for a set of 5 word pairs includes the following frequencies "4, 5, 5, 2, 3," then the line threshold for the selected line is defined by the frequency with the most occurrences in the modified word pair frequency map, "5" in this example. The clustering engine may then generate pattern information for the selected line based at least in part on the line threshold 712. In an embodiment, the pattern information includes word pairs in the selected line with frequencies greater than or equal to the line threshold based at least in part on the word pair frequency map as described above. Returning to the example above with a line threshold of 5, the pattern for the line includes the word pairs in the line with a frequency of 5 or greater in the updated word pair frequency map generated in step 706.

The cluster engine may then determine if there are lines remaining in the log data 714. If there are lines remaining, then the clustering engine may return to step 704 and select the next line and continue with the process 700. If there are no lines remaining in the log data, the clustering engine may provide results 716. The results may include any patterns generated for the lines of the log data and the updated word pair frequency map. In addition, the results may include other information determined by the clustering engine such as a number of occurrences of a particular pattern during an interval of time indicated in the unstructured logs. The results, in various embodiments, are provided to a customer as described above, for example, to enable the customer to monitor the operation of computing resources. In yet other embodiments, the results are stored in a storage device and maintained for use later by the clustering engine.

Note that one or more of the operations performed in 702-716 may be performed in various orders and combinations including in parallel. For example, the system executing the process 700 may process multiple lines of the log data in parallel. In numerous variations to the process 700, one or more of the operations 702-716 may be omitted or performed by other systems or services.

Figure 8:
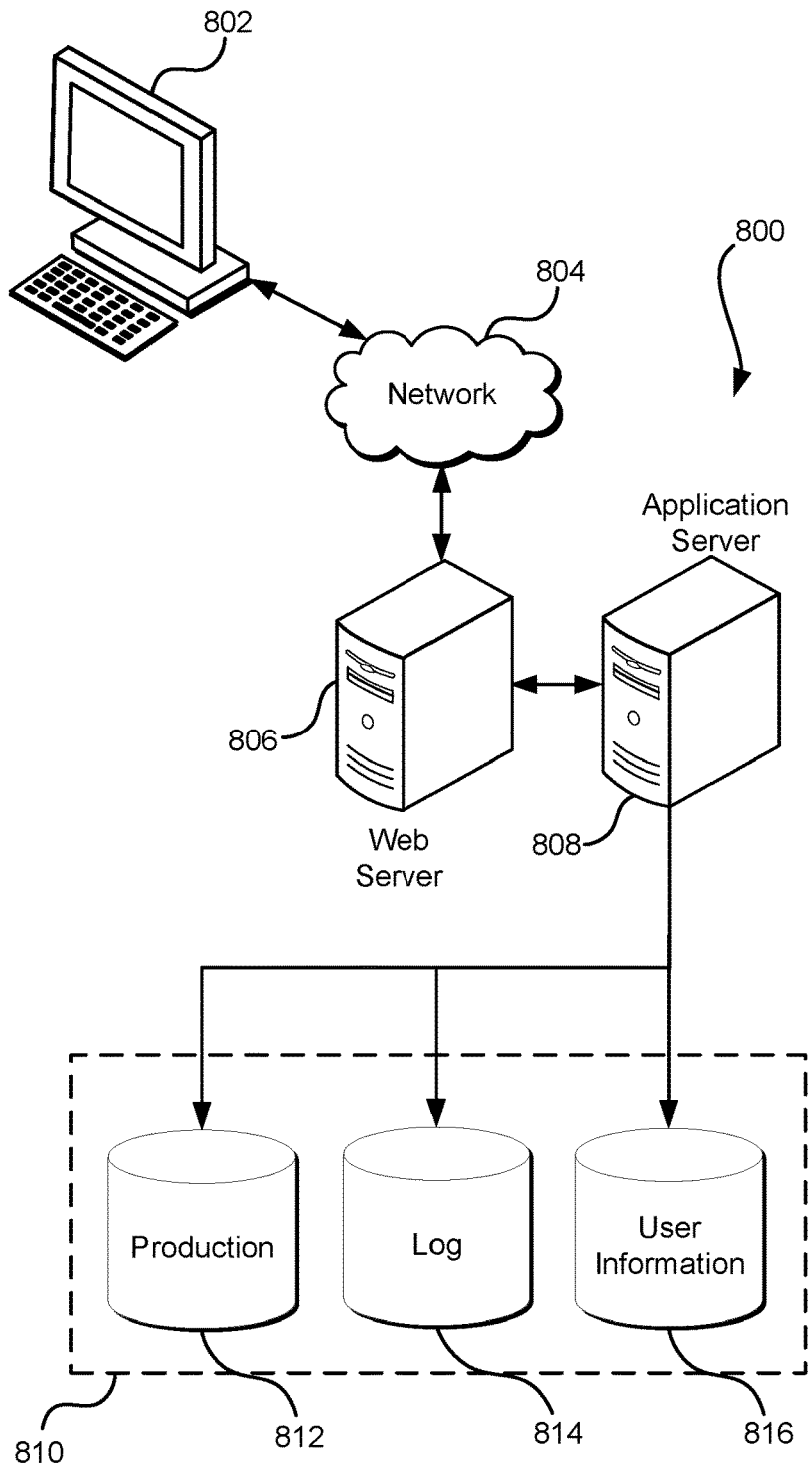
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, as a result of being executed by one or more processors of a computer system, cause the computer system to at least:
    obtain unstructured log data;
    process a training phase on a portion of the unstructured log data to generate a first set of line patterns and a word pair frequency map;
    process an analyzing phase on a second portion of the unstructured log data by at least:
        updating the word pair frequency map based at least in part on word pair frequencies in a first line included in the unstructured log data;
        determining a first modified word pair frequency map based at least in part on a first maximum relative to adjacent pairs of word pairs in the first line;
        selecting, from the first modified word pair frequency map, a first line threshold for the first line based at least in part on a first frequency indicated in the first modified word pair frequency map relative to at least one other frequency indicated in the first modified word pair frequency map; and
        generating a second set of line patterns by at least selecting, from the second line, words pairs as indicated by the word pair frequency map relative to the first line threshold; and
    use the first set of line patterns and the second set of line patterns to generate frequency information that indicates frequencies of particular line patterns in the unstructured log data.

2. The non-transitory computer-readable storage medium of claim 1, wherein the instructions further comprise instructions that, as a result of being executed by the one or more processors, cause the computer system to perform an operation on the unstructured log data to improve performance of at least the training phase or the analyzing phase.

3. The non-transitory computer-readable storage medium of claim 2, wherein the instructions that cause the computer system to perform the operation on the unstructured log data further include instructions that cause the computer system to remove data and time information from the unstructured log data.

4. The non-transitory computer-readable storage medium of claim 1, wherein the training phase further comprises:
    determining a second modified word pair frequency map based at least in part on a second maximum relative to adjacent pairs of word pairs in a second line included in the portion of the unstructured log data;
    selecting, from the second modified word pair frequency map, a second line threshold for the second line based at least in part on a second frequency indicated in the second modified word pair frequency map relative to at least one other frequency indicated in the second modified word pair frequency map; and
    generating the first set of line templates by at least selecting, from the second line, words pairs as indicated by the word pair frequency map relative to the second line threshold.

5. A system, comprising:
    one or more processors; and
    memory that stores computer-executable instructions that, if executed, cause the one or more processors to:
        obtain log data;
        update a word frequency map based at least in part on an entry of the log data, the word frequency map indicating a number of occurrence of words in the log data;

determine a modified word frequency map based at least in part on a frequency of adjacent words indicated in the word frequency map;

determine a line threshold based at least in part on information in the modified word frequency map; and generate a pattern by at least selecting words as indicated by the word frequency map as having a value relative to the line threshold.

6. The system of claim 5, wherein the memory further includes computer-executable instructions that, if executed, cause the one or more processors to process the log data by at least removing information common to a plurality of lines of the log data.

7. The system of claim 6, wherein the memory further includes computer-executable instructions that, if executed, cause the one or more processors to generate training data for a portion of the log data, the training data including the word frequency map and a set of patterns generated based at least in part on the portion of the log data.

8. The system of claim 7, wherein the memory further includes computer-executable instructions that, if executed, cause the one or more processors to:

update the word frequency map based at least in part on a second entry of the log data;

determine a second modified word frequency map based at least in part on the greater of a second frequency of adjacent words;

determine a second line threshold based at least in part on information in the second modified word frequency map; and generate a second pattern by at least selecting words as indicated by the word frequency map as having a second value greater to or equal to the second line threshold.

9. The system of claim 8, wherein the memory further includes computer-executable instructions that, if executed, cause the one or more processors to update frequency information associated with the pattern based at least in part on the pattern, the second pattern, and the set of patterns.

10. The system of claim 5, wherein obtaining the log data further comprises obtaining the log data as a stream of data to be processed near contemporaneously with obtaining the log data.

11. The system of claim 5, wherein obtaining the log data further comprises obtaining the log data from a computing resource responsible for generating the log data.

12. The system of claim 5, wherein obtaining the log data further comprises obtaining the log data from a storage device maintained by a storage service, the storage device containing log data for an interval of time.

13. A computer-implemented method, comprising:

obtaining log data;

determining a word pair frequency based at least in part on a portion of the log data, the word pair frequency indicating a number of occurrences of word pairs in the log data; and processing a first line of the log data by at least:

determining a modified word pair frequency based at least in part on a value relative to a first word pair of the first line and a second word pair of the first line;

determining a line threshold for the first line based at least in part on a frequency indicated in the modified word pair frequency that has a number of occurrences in the modified word pair frequency relative to at least one other number of occurrences in the modified word pair frequency; and generating a set of line patterns for the first line by at least selecting word pairs as indicated by the word pair frequency relative to the line threshold.

14. The computer-implemented method of claim 13, wherein the computer-implemented method further comprises:

processing a second line of the log data by at least:

updating the word pair frequency based at least in part on a set of words included in the second line of the log data;

determining a second modified word pair frequency based at least in part on adjacent word pairs in the set of words;

determining a second line threshold for the second line based at least in part on frequency information indicated in the second modified word pair frequency by at least selecting a second number of occurrences in the second modified word pair frequency relative to at least one other number of occurrences in the second modified word pair frequency; and generating a second set of line patterns for the second line by at least selecting words pairs as indicated by the word pair frequency relative to the line threshold.

15. The computer-implemented method of claim 13, wherein the computer-implemented method further comprises processing the log data to generate preprocessed log data further by at least removing date and time information from the plurality of lines of the unstructured log data.

16. The computer-implemented method of claim 15, wherein processing the unstructured log data to generate the preprocessed log data further comprises determining a common delimiter based at least in part on the plurality of lines of the unstructured log data.

17. The computer-implemented method of claim 15, wherein processing the unstructured log data to generate the preprocessed log data further comprises removing information included in the log data common to at least two entries of the log data.

18. The computer-implemented method of claim 13, wherein the computer-implemented method further comprises updating frequency information associated with the set of line patterns.

19. The computer-implemented method of claim 18, wherein the computer implemented method further comprises transmitting the frequency information associated with the set of line patterns to an end point associated with a customer operating computing resources responsible for generating the log data.

20. The computer-implemented method of claim 19, the frequency information associated with the set of line patterns further comprises frequency information indicating a distribution of occurrences of line patterns of the set of line patterns over a plurality of intervals of time.

* * * * *